United States Patent [19]

Kauffman et al.

[11] Patent Number: 4,519,912

[45] Date of Patent: May 28, 1985

[54] PROCESS FOR THE REMOVAL OF SULFATE AND METALS FROM AQUEOUS SOLUTIONS

[75] Inventors: Jim W. Kauffman; William C. Laughlin, both of Edmond; Roger A. Baldwin, Oklahoma City, all of Okla.

[73] Assignee: Kerr-McGee Corporation, Oklahoma City, Okla.

[21] Appl. No.: 616,416

[22] Filed: Jun. 1, 1984

[51] Int. Cl.$^3$ ................................................ C02F 3/34
[52] U.S. Cl. .................................... 210/611; 210/616; 210/912
[58] Field of Search ................. 210/610, 611, 615–618, 210/912, 913

[56] References Cited

U.S. PATENT DOCUMENTS

| | | |
|---|---|---|
| 4,108,722 | 8/1978 | Stover . |
| 4,124,501 | 11/1978 | Yen et al. ........................ 210/611 X |
| 4,200,523 | 4/1980 | Balmat ................................ 210/611 |
| 4,332,904 | 6/1982 | Kurane et al. .................. 210/611 X |
| 4,354,937 | 10/1982 | Hallberg . |

OTHER PUBLICATIONS

Sorg et al., "Removal of Selenium from Drinking Water-State of the Art", Symposium on Selenium-Tellurium in the Environment, 5/11-13, 1976, pp. 114-128.

*Primary Examiner*—Thomas Wyse
*Attorney, Agent, or Firm*—William G. Addison; John P. Ward

[57] ABSTRACT

A process is provided for reducing the concentrations of water soluble ionic selenium species, sulfate ion and ionic heavy metal species in aqueous waste solutions containing the same. The process comprises passing said waste solution through a treatment zone containing a porous matrix on which are retained populations of at least one anaerobic bacteria of the genus Clostridium and at least one anaerobic bacteria selected from the group consisting of bacteria of the genera Desulfovibrio and Desulfotomaculum. The passing of said aqueous solution through said treatment zone is carried out at predetermined rates of flow and contacts between said solution and said bacteria is conducted under anaerobic conditions and at predetermined pH and temperature levels. The process provides for the conversion of the water soluble ionic selenium species to water insoluble selenium metal and the conversion of the water soluble ionic heavy metal species to water insoluble heavy metal species, both of which are substantially retained on the porous matrix and both of which can be recovered therefrom.

19 Claims, No Drawings

PROCESS FOR THE REMOVAL OF SULFATE AND METALS FROM AQUEOUS SOLUTIONS

CROSS-REFERENCE TO RELATED APPLICATIONS

Aspects of the present invention are related to subject matter disclosed in co-pending applications entitled PROCESS FOR THE REMOVAL AND RECOVERY OF HEAVY METALS FROM AQUEOUS SOLUTIONS, Ser. No. 616,415, and PROCESS FOR THE REMOVAL AND RECOVERY OF SELENIUM FROM AQUEOUS SOLUTIONS, Ser. No. 616,417, both co-pending applications filed on an even date herewith and both assigned to the same assignee as the present invention.

FIELD OF THE INVENTION

The present invention relates to a process for reducing the concentration of water soluble ionic selenium species, sulfate ions and ionic heavy metal species in aqueous solutions. More particularly, the present invention relates to a process for the removal of water soluble ionic selenium species, sulfate ions and ionic heavy metal species from aqueous waste streams such as spent leaching solutions or mine discharge waters prior to the discarding of such streams into, for example, the groundwater system. The invention also provides for the recovery of selenium, as metallic selenium, which can subsequently be converted to useful selenium products and for recovery of water insoluble heavy metal species.

BACKGROUND OF THE INVENTION

Each year tens of millions of gallons and more of contaminated aqueous solutions are discharged as industrial wastes. These solutions may contain a variety of contaminants, including ionic selenium species, sulfate ions and ionic heavy metal species, substances which are objectionable from an environmental standpoint. Typical examples of industries which generate and discharge waste solutions containing contaminants such as those enumerated above include the chemical, metal processing and mining industries.

Due to the real as well as the potential adverse impacts that such contaminants as sulfate do and can have on man and environment, both federal and state agencies have promulgated and put into force numerous regulations establishing maximum concentration levels for these contaminants in industrial waste solutions discharged into our groundwater systems. As an example of such regulations, the current allowable maximum concentration levels for sulfate ions in mine discharge waters permitted by the State of New Mexico is 600 milligrams of sulfate per liter of the discharged water. Furthermore, this State also has established maximum concentration levels for such metals as selenium and heavy metals such as uranium and molybdenum of 0.05, 5.0 and 1.0 milligrams of said metals, respectively, per liter of the discharged water. Other state agencies have established similar regulations, although the maximum concentration levels permitted may vary from state to state.

In order to comply with these regulations, a number of processes have been used or are now undergoing testing and development to effect removal of various contaminants. Such processes include gravity sedimentation, flotation, filtration, ion exchange, activated adsorption, reverse osmosis, electrodialysis, distillation and chemical precipitation. However, many of these processes are not ideally suited to treat large volumes of water or are excessively expensive to install and operate in comparison with their overall efficiency and effectiveness.

In addition to the above processes, various biological processes are known for removing contaminants from waste water solutions, including the removal of sulfate and heavy metals. In such processes sulfate reducing bacteria are employed to reduce the sulfate to hydrogen sulfide which in turn reacts with the heavy metals to form water insoluble heavy metal sulfide which precipitate out of solution. Typical examples of such known biological processes for removal of sulfate and heavy metal contaminants from aqueous processing waste streams or solutions include U.S. Pat. No. 4,354,937 and U.S. Pat. No. 4,108,722.

Drawbacks to the use of biological processes, however, also are well known. These include, to illustrate but a few, the production of metabolic wastes which in and of themselves represent real or potential pollution problems and the formation of fine crystalline sulfide precipitates the removal of which, by sedimentation or filtration, is extremely difficult.

Furthermore, biological processes such as those enumerated above are not known to be capable of removing ionic selenium species which often are present in combination with sulfate and heavy metal contaminants in many aqueous processing waste streams. This is particularly true of aqueous waste streams such as discharge waters from uranium mining and processing operations.

SUMMARY OF THE INVENTION

The surprising discovery now has been made that it is possible to substantially reduce the concentration of ionic selenium species, sulfate ions and ionic heavy metal species in aqueous solutions by contacting the aqueous solutions with populations of bacteria, contained on a porous matrix, said bacteria being capable of metabolically reducing ionic selenium species to water insoluble metallic selenium and sulfate ions to hydrogen sulfide which in turn reacts with the ionic heavy metal species to form water insoluble heavy metal species. The water insoluble metallic selenium and the water insoluble heavy metal species substantially are retained on the porous matrix. The resultant aqueous effluent is characterized by significantly lower concentrations of water soluble ionic selenium, sulfate and heavy metals species.

The contacting of the aqueous solutions containing water soluble ionic selenium species, sulfate ions and ionic heavy metal species with the reducing bacteria contained on the porous matrix is carried out under anaerobic conditions and in the presence of nutrients and at temperatures capable of providing for continued growth and steady state population densities of the bacteria.

DETAILED DESCRIPTION OF THE INVENTION

In accordance with the present invention, a process for substantially removing water soluble ionic selenium species, sulfate ions and ionic heavy metal species from aqueous solutions containing these contaminants is provided. Aqueous solutions which can be treated in accordance with the process of this invention can include any process effluent such as, for example, water from uranium mining and leaching operations, mine seepage or drainage waters and any other aqueous streams which contain such wate soluble ionic selenium, sulfate and heavy metal contaminants. To facilitate the description and understanding of the process of the present invention, specific reference hereinafter will be made to aqueous solutions comprising mine discharge waters, wherein such ionic selenium, sulfate and heavy metal contaminants are present.

In accordance with the process of the present invention, a mine discharge water is introduced into a treatment zone, wherein there is provided a porous matrix containing populations of at least one anaerobic bacteria from the genus Clostridium and at least one bacteria selected from the group consisting of bacteria of the genera Desulfovibrio and Desulfotomaculum through which the mine discharge water must pass. These families of anaerobic bacteria include species such as, for example, *C. butyricum, C. pasteurianum, C. acidiurici, C. kluyveri, C. aceticum, D. desulfuricans, D. africanus, D. gigas, D. salexigens, D. vulgaris* and the like, and various subspecies thereof. With regard to the genera Desulfovibrio and Desulfotomaculum, bacteria of the genus Desulfovibrio are preferred for use in combination with bacteria of the genus Clostridium in the process of the present invention.

The treatment zone can be any suitable structure, including, but not limited to, structures such as, for example, vessels, tanks, earthen ponds and the like. Within this treatment zone, the porous matrix contained therein will be under anaerobic conditions, i.e., in the substantial absence of free atmospheric oxygen. Under such anaerobic conditions, the Clostridium bacteria contained on the porous matrix metabolically reduces the water soluble ionic selenium species comprising, generally, ionic selenium in the $+IV$ and $\rightleftharpoons VI$ oxidation states to water insoluble metallic selenium which is retained on the porous matrix. In this regard, it is believed that the water insoluble metallic selenium is encapsultated or substantially encapsulated within the cellular structure of the Clostridium bacteria which are contained on the porous matrix. Also, under these conditions (i.e., anaerobic conditions), the Desulfovibrio or Desulfotomaculum bacteria, contained on the porous matrix, metabolically reduce the sulfate ions to hydrogen sulfide which then reacts with the water soluble ionic heavy metal species to form water insoluble particulate heavy metal species. These water insoluble heavy metal species which include, for example, water insoluble heavy metal sulfides, oxides and other reduced forms of said heavy metals and which precipitate from the mine discharge water, are retained on the porous matrix. As a result of these various metabolic reduction processes, the effluent exiting the treatment zone contains significantly reduced concentrations of selenium, sulfate and heavy metal ionic contaminants compared to the concentrations of these contaminants in the mine discharge water entering said treatment zone.

Various materials can be employed as the porous matrix support for the populations of Clostridium and Desulfovibrio of Desulfotomaculum bacteria within the treatment zone. To be useful, these matrix materials must at least possess a porosity capable of allowing passage of the mine discharge water through the treatment zone at rates of flow within the ranges set forth hereinbelow and also must be substantially inert, i.e., neither destroy the bacteria per se nor interfere with said bacteria's ability to metabolically reduce the water soluble selenium and sulfate ions. Representative, but non-limiting, examples of such materials include soil, sand, cellulose, glass wool, glass beads and the like, with soils and sands and combinations thereof being the preferred matrix materials. When employing materials which do not contain naturally occurring populations of Clostridium and Desulfovibrio or Desulfotomaculum bacteria such as glass wool, for example, it will be necessary to first inoculate these materials with the Clostridium and Desulfovibrio or Desulfotomaculum bacteria.

The pH of the mine discharge water entering the treatment zone, the rate of flow of the mine discharge water through said treatment zone, the presence of nutrients in said treatment zone and the temperature of the combination of the mine water and porous matrix within said zone are all parameters critical to carrying out the process of this invention. In general, the pH of the mine water entering the treatment zone must be about 6.0 and generally will range from about 6 to about 11. A most preferred range of pH values is from about 7.0 to about 10.0. If adjustment of the pH of the mine discharge water or the environment within the treatment zone is necessary, this can be accomplished by the addition of a suitable acidic or alkaline material such as sulfuric acid, lime, caustic and the like to either the mine water or the treatment zone or both.

For any given rate of flow of the mine discharge water through the porous matrix, the extent of removal of the ionic selenium species through the metabolic reduction thereof to selenium metal and the removal of the ionic heavy metal species through the metabolic reduction of sulfate ions to hydrogen sulfide and subsequent reaction thereof with the heavy metals to form water insoluble heavy metal species is dependent on the amount of nutrient available to both the Clostridium and Desulfovibrio or Desulfotomaculum bacteria, contained on the porous matrix, for growth and establishment of sufficiently large population densities of these bacteria. For example, as the amount of nutrient available to the bacteria for growth and the establishment of large population densities increases, the extent of selenium, sulfate and heavy metals removal from the mine waters contacted with said bacteria also increases. Conversely, as the amount of nutrient decreases, the growth and population densities of the bacteria contained on the porous matrix decreases, resulting in a concomitant decrease in the amount of the water soluble ionic selenium, sulfate and heavy metal species which can be removed from the mine water.

The presence of nutrients in the mine water/porous matrix environment within the treatment zone serves to provide the energy and other materials necessary for cell growth. Thus, the capacity of the bacteria to grow and maintain steady state population densities within the porous matrix is determined by said bacteria's ability to utilize the particular nutrients, including trace nutrients, present in the bacteria's surroundings. For bacteria of the genera Clostridium and Desulfovibrio or Desulfotomaculum, nutrients having the ability to provide for the growth and steady state population densities thereof include such organic carbon source materials as cellulose, hemicellulose, pectic substances, inulin, chitin, lignin, hydrocarbons, starches, sugars, proteins, amino acids, organic acids, derivatives of these various materials, and biological and municipal waste water sludges.

Of these, starches, cellulose, lignin, municipal waste water sludges and sugars, such as sucrose and glucose, are the preferred materials to be employed as nutrients in the process of this invention. Trace nutrients, necessary to the bacteria's growth, include, for example, nitrogen, phosphorous potassium, magnesium, sulfur, iron, calcium, manganese, zinc, copper, molybdenum, cobalt and other growth factors such as, for example, vitamins, and will be added to the mine water, porous matrix or mine water/porous matrix environment within the treatment zone. Such trace nutrients can occur naturally within the materials employed as the porous matrix or the mine water being treated or both. In such event, external addition of such trace nutrients will generally be unnecessary.

The amount of nutrient added to the mine water/porous matrix environment within the treatment zone will be an amount capable of providing a rate of growth for and the establishment of steady state population densities of said Clostridium and Desulfovibrio or Desulfotomaculum bacteria sufficient to yield an aqueous effluent having predetermined, reduced concentrations of said selenium, sulfate and heavy metal ions therein. Generally, said predetermined, reduced concentrations of selenium, sulfate and heavy metal ions correspond to at least the maximum concentration levels for such ions in the discharge effluents as established by either federal or state regulatory agencies for the locale in which said discharge is taking place. For example, as noted hereinabove, in the State of New Mexico, the maximum concentration levels for selenium, sulfate and the heavy metals, uranium and molybdenum, in mining or ore processing waste waters are 0.05, 600, 5.0 and 1.0 milligrams of said contaminants, respectively, per liter of such waste waters. Thus, in the biological treatment of such waste waters, in accordance with the process of this invention, sufficient nutrient will be added, as needed, to the mine water/porous matrix environment in the treatment zone for the growth and establishment of large populations of Clostridium and Desulfovibrio or Desulfotomaculum bacteria to yield an effluent containing, at most, these maximum concentration levels. Determination of the need for and amount of nutrient to accomplish the above purposes readily can be made by analysis of the mine water entering the treatment zone and the effluent exiting said zone for selenium, sulfate and heavy metal, e.g., uranium and molybdenum, ion contents. An increase in the concentration of any of these ions in the effluent stream exiting the treatment zone above the predetermined, maximum concentration levels for such ions will indicate the need for additional nutrient to re-establish the growth and population densities of the Clostridium and Desulfovibrio or Desulfotomaculum bacteria contained on the porous matrix within the treatment zone. Nutrient will be added to the treatment zone until such time as the predetermined, maximum concentration levels for all of the contaminant ions in the effluent from the treatment zone once again have been achieved.

Although the above teachings relate to the intermittent addition of nutrient to the treatment zone as required to provide the necessary energy for the growth and establishment of large population densities of the Clostridium and Desulfovibrio or Desulfotomaculum bacteria therein, such addition may be carried out on a continuous basis. In such event, only periodic analysis of the effluent stream exiting the treatment zone need be made to determine that the necessary growth and population densities of the bacteria are being maintained for substantial reduction of the various contaminants.

The treatment zone, in which the mine water to be treated and the porous matrix containing the Clostridium and Desulfovibrio or Desulfotomaculum bacteria are retained, will be maintained at temperatures ranging from about 0° C. to about 65° C., preferably at temperatures from about 0° C. to about 35° C., and most preferably at temperatures ranging from about 12° C. to about 35° C. This range of temperatures is critical for optimizing the growth and population densities of both the Clostridium and Desulfovibrio or Desulfotomaculum bacteria and, thus, optimization of the extent of removal of the ionic selenium, sulfate and heavy metal contaminants. Although decreases in the extent of removal of these ion contaminants has been observed when operating at the lower end of the above indicated broad temperature range, it has been further observed that the amount of available nutrient is interrelated with the extent of removal of said ionic contaminants. Thus, even at the lower end of the above broad temperature range, the extent of removal of these ionic contaminants can be increased by providing an ample supply of nutrient to the treatment zone.

The rate of flow of the mine water into and through the treatment zone containing the porous matrix and Clostridium and Desulfovibrio or Desulfotomaculum bacteria can range up to about 820.0 liters of said mine water per square meter of the porous matrix in said zone per day. In a preferred embodiment, this rate of flow will range from about 86.0 to about 270.0 liters of mine water per square meter of the porous matrix per day. At or within these flow rates, it has been observed that the selenium and sulfate ions in the mine water being treated will have sufficient time to make contact with the Clostridium and Desulfovibrio or Desulfotomaculum bacteria on the porous matrix and, thereby, undergo the desired metabolic reductions to metallic selenium and hydrogen sulfide, respectively. These flow rates also permit reaction of the hydrogen sulfide, produced by the metabolic reduction of the sulfate ions by the Desulfovibrio or Desulfotomaculum bacteria, with the heavy metal ions in the mine water to form water insoluble particulate heavy metal species.

As disclosed hereinabove, both the water insoluble metallic selenium and the water insoluble heavy metal species both are retained on the porous matrix leaving a purified aqueous effluent. However, with respect to the water insoluble selenium metal, it is believed that this metal is retained on the porous matrix encapsulated or substantially encapsulated within the cellular structure of the Clostridium bacteria on the porous matrix.

The water soluble ionic heavy metal species which can be removed from the mine discharge waters in accordance with this invention as water insoluble sulfides, oxides and other water insoluble reduced forms are those wherein the metal component thereof is at least one metal selected from the group consisting of metals of Groups IB, IIB, IVB, VA, VIB, VIII and the Actinide Series of the Periodic Table of Elements. Representative examples of metals in these various Groups include silver, copper, zinc, mercury, cadmium, lead, tin, bismuth, antimony, molybdenum, cobalt, nickel, iron, thorium, uranium and the like. Through the use of the novel process described and claimed herein, these heavy metals can be efficiently and economically removed from the mine discharge waters.

As disclosed hereinabove, the ionic selenium species which can be removed from the mine discharge waters utilizing the process of this invention are selenium ions in the +IV and +VI oxidation states. Examples of selenium ions in the +IV and +VI oxidation states include selenite ($SeO_3^{-2}$) and selenate ($SeO_4^{-2}$) ions. Again, through the use of the process described herein, these selenite and selenate ions can be efficiently and economically removed in significant amounts from the mine discharge waters.

Both the water insoluble selenium metal and the water insoluble heavy metal species retained on the porous matrix can be separated from said matrix. One method for separating the water insoluble selenium metal and heavy metal species from the matrix is to elutriate said matrix with an aqueous solution such as, for example, water or effluent previously recovered from the treatment zone. Elutriation of the porous matrix to remove the metallic selenium and water insoluble heavy metal species preferably will be carried out within the treatment zone for a time sufficient to remove substantially all of these materials from the porous matrix within said zone. The rate of flow of the aqueous solution through the treatment zone will be a rate sufficient to elutriate the metallic selenium and water insoluble heavy metal species from the porous matrix without substantially removing the matrix itself from said zone. The selenium metal and water insoluble heavy metal species containing eluate recovered from the porous matrix can be subjected to further processing to separate the water insoluble heavy metal species from the eluate leaving a liquor containing a source of metallic selenium suitable for use in the manufacture of various selenium products.

The following non-limiting examples are presented as being illustrative of the practice of the present invention. In these examples, all parts are by weight unless indicated otherwise.

EXAMPLE I

To a vertically positioned cylindrical vessel having a diameter of 0.91 meters and equipped with inlet and outlet means is added approximately 1,633 kilograms of a 50/50 (wt/wt) sand and soil mixture, said soil containing naturally occurring populations of Clostridium and Desulfovibrio bacteria. This mixture provides a porous matrix within the vessel of about 1.52 meters in depth. An aqueous stream, from a mining operation, continuously is introduced to the top of the vessel through the inlet means provided therein. This stream contains substantial concentrations of water soluble selenium (Se), sulfate ($So_4^{-2}$), uranium (U) and molybdenum (Mo) contaminants. This aqueous stream is percolated downwardly through the vessel and matrix of mixed sand and soil and is removed, as effluent, from the bottom of the vessel through the outlet means therein. The continuous introduction of the aqueous stream to and removal of the effluent from the vessel is continued for a period of 161 days.

The solution pH of the aqueous stream passing through the vessel is about 8.0. The rates of flow of the aqueous stream through the vessel and the temperatures within the vessel during this period range from about 79.0 to about 163.0 liters per square meter of the matrix per day and from about 14° C. to about 21° C., respectively. During this operational period, sucrose is added either intermittently or continuously to the aqueous stream in the space above the mixed sand and soil matrix in the vessel to maintain a concentration of about 0.7 grams of sucrose per liter of said stream commencing on the 70th day of operation. The appearance of a brick red color within the porous matrix confirms the metabolic reduction of the water soluble selenium ions in the aqueous stream to metallic selenium and its retention on the porous matrix. Also, periodic analysis is made of the aqueous stream entering said vessel and the effluent exiting said vessel to determine the concentrations of water soluble selenium, sulfate, uranium and molybdenum ions therein, respectively. Data relating to this Example are provided in the Table below.

TABLE

| Days of Operation | U Conc. mg/l Inlet | U Conc. mg/l Outlet | $SO_4^{-2}$ Conc. mg/l Inlet | $SO_4^{-2}$ Conc. mg/l Outlet | Mo Conc. mg/l Inlet | Mo Conc. mg/l Outlet | Se Conc. mg/l Inlet | Se Conc. mg/l Outlet |
| --- | --- | --- | --- | --- | --- | --- | --- | --- |
| 13 | 0.49 | 0.75 | 780 | 970 | 0.600 | 0.600 | 1.20 | 1.00 |
| 49 | 0.61 | 0.56 | 850 | 960 | 0.680 | 0.780 | 1.10 | 0.380 |
| 70[a] | 0.85 | 0.76 | 960 | 940 | 0.620 | 0.830 | 0.96 | 0.037 |
| 105[b] | 0.94 | 1.00 | 800 | 770 | 0.450 | 0.270 | 1.30 | 0.018 |
| 133 | — | 0.050 | — | 520 | — | 0.046 | — | 0.015 |
| 161 | 0.330 | 0.070 | 950 | 520 | 0.680 | 0.031 | 1.30 | 0.005 |

[a]intermittent addition of sucrose commenced
[b]continuous addition of sucrose commenced While the invention herein has been described in terms of what at present are believed to be the preferred embodiments thereof, it is to be understood that this invention is not limited to these specific embodiments and that changes thereto can be made without departing from the spirit and scope thereof except as provided in the following claims.

What is claimed is:

1. A process for reducing the concentration of water soluble ionic selenium species, sulfate ions and ionic heavy metal species in an aqueous solution containing the same comprising:

provided an aqueous solution containing said water soluble ionic selenium species, sulfate ions and ionic heavy metal species, said aqueous solution having a pH of at least about 6.0;

providing a porous matrix containing a population of bacteria comprising at least one anaerobic bacteria of the genus Clostridium and at least one anaerobic bacteria selected from the group consisting of bacteria of the genera Desulfovibrio and Desulfotomaculum, said bacteria being capable of matabolically reducing said ionic selenium species to water insoluble metallic selenium and said sulfate ions to hydrogen sulfide, respectively, said matrix being under anaerobic conditions; and passing said aqueous solution through said porous matrix in the presence of nutrients and at predetermined temperatures, said nutrients and said temperatures providing for the growth and steady state population density of said bacteria, to contact the ionic selenium species and the sulfate ions in said aqueous solution with the bacteria contained in the porous matrix whereby said bacteria metabolically reduce at least a portion of the ionic selenium species to water insoluble metallic selenium and at least a portion of the sulfate ions to hydrogen sulfide which, in turn, reacts with at least a portion of the water soluble ionic heavy metal species to form water insoluble heavy metal species, said water insoluble metallic selenium and water insoluble heavy metal species being substantially retained on the porous matrix, and to produce an aqueous effluent having a reduced concentration of said water soluble ionic selenium species, sulfate ion and ionic heavy metal species.

2. The process of claim 1 wherein the ionic selenium species in said aqueous solution are in the +IV and +VI oxidation states.

3. The process of claim 1 wherein the metal components in the water soluble ionic heavy metal species in said aqueous solution are capable of reacting with hydrogen sulfide to form water insoluble heavy metal species.

4. The process of claim 1 wherein the pH of the aqueous solution containing said ionic selenium species, sulfate ions and ionic heavy metal species ranges from about 6.0 to 11.0.

5. The process of claim 1 wherein said water insoluble metallic selenium, retained on the porous matrix, is encapsulated or substantially encapsulated within the cellular structure of the Clostridium bacteria contained on said matrix.

6. The process of claim 1 wherein said aqueous solution is continuously passed through said porous matrix at a rate up to about 820 liters of the aqueous solution per square meter of the porous matrix per day.

7. The process of claim 6 wherein the passing of said aqueous solution through said porous matrix containing said bacteria is carried out in the presence of at least one nutrient comprising an organic carbon source and in the presence of at least one trace nutrient.

8. The process of claim 7 wherein said nutrient, comprising an organic carbon source, is at least one material selected from the group consisting of cellulose, hemicellulose, pectic substances, inulin, chitin, lignin, hydrocarbons, starches, sugars, proteins, amino acids, organic acids, derivatives of said materials and biological and municipal waste water sludges.

9. The process of claim 8 wherein the passing of said aqueous solution through said porous matrix containing said bacteria in the presence of said nutrient is carried out at a temperature ranging from about 0° C. to about 65° C.

10. The process of claim 6 further comprising continuously separating from said porous matrix an aqueous effluent containing a significiantly reduced concentrations of said water soluble ionic selenium species, sulfate ions and ionic heavy metal species.

11. The process of claim 1 further comprising separating and recovering said water insoluble metallic selenium and water insoluble heavy metal species from said porous matrix.

12. A continuous process for reducing the concentration of water soluble ionic selenium species, sulfate ions and ionic heavy metal species in an aqueous solution containing the same comprising:

providing an aqueous solution containing water soluble ionic selenium species in the +IV and +VI oxidation states, sulfate ions and water soluble ionic heavy metal species, said water soluble ionic heavy metal species being capable of reacting with hydrogen sulfide to form water insoluble heavy metal species, said aqueous waste solution having a pH ranging from about 6 to about 11;

providing a porous matrix containing populations of at least one Clostridium bacteria and at least one Desulfovibrio bacteria, said bacteria being capable of metabolically reducing said water soluble ionic selenium species to water insoluble metallic selenium and said sulfate ions to hydrogen sulfide, respectively, said matrix being under anaerobic conditions;

continuously passing said aqueous waste solution through said porous matrix at a rate up to about 820 liters of the aqueous waste solution per square meter of the porous matrix per day, in the presence of at least one nutrient comprising an organic carbon source and selected from the group consisting of cellulose, hemicellulose, pectic substances, inulin, chitin, hydrocarbons, starches, sugars, proteins, amino acids, organic acids biological and municipal sludges waste water and in the presence of at least one trace nutrient and at a temperature ranging from about 0° C. to about 65° C., said nutrient and said temperature providing for the growth and steady state population density of the bacteria in said matrix, to contact said selenium species with said Clostridium bacteria and thereby metabolically reduce said selenium species to water insoluble selenium metal and to contact said sulfate ions with said Desulfovibrio bacteria and thereby metabolically reduce at least a portion of said sulfate ions to hydrogen sulfide which reacts with at least a portion of the water soluble heavy metal ionic species to form water insoluble heavy metal species, said water insoluble selenium metal being substantially encapsulated in said Clostridium bacteria, said encapsulated selenium metal and water insoluble heavy metal species being substantially retained on the porous matrix; and continuously separating from said porous matrix an aqueous effluent containing a reduced concentration of said water soluble ionic selenium species and water soluble ionic heavy metal species.

13. The process of claim 12 further comprising separating and recovering said water insoluble metallic selenium and said water insoluble heavy metal species from said porous matrix.

14. The process of claim 12 wherein said aqueous solution is a mine discharge water.

15. The process of claim 14 wherein the pH of said mine discharge water ranges from about 7.0 to about 10.0.

16. The process of claim 12 wherein heavy metal components of the ionic heavy metal species in said discharge water are comprised of at least one metal, in an ionic state, selected from the group consisting of metals of Group IB, IIB, IVB, VA, VIB, VIII and the Actinide Series of the Periodic Table for Elements.

17. The process of claim 12 wherein said porous matrix is comprised of at least a porous soil, said soil containing naturally occurring populations of Clostridium and Desulfovibrio bacteria, said soil being contained in a treatment zone under anaerobic conditions.

18. The process of claim 17 wherein said aqueous solution is continuously passed through said porous matrix, contained in said treatment zone under anaerobic conditions, at a rate of flow ranging from about 86.0 to about 270 liters of aqueous solution per square meter of the porous matrix per day and where the passing of said aqueous solution through said porous matrix is carried out at a temperature ranging from about 0° C. to about 35° C. and preferably at a temperature ranging from about 12° C. to about 35° C.

19. The process of claim 18 wherein the passing of said aqueous solution through said porous matrix in said treatment zone is carried out in the presence of at least one nutrient comprising an organic carbon source and selected from the group consisting of sucrose, glucose, starch, lignin and municipal waste water sludges.

* * * * *